March 31, 1970  H. BEYERSDORF  3,504,153
METHOD OF SPARK MACHINING STATOR OR ROTOR HAVING LAMINATION
SIMULATING CHARACTERISTICS
Filed Oct. 11, 1966

INVENTOR
Hartwig Beyersdorf

BY Spencer & Kaye

ATTORNEYS

United States Patent Office 3,504,153
Patented Mar. 31, 1970

3,504,153
METHOD OF SPARK MACHINING STATOR OR ROTOR HAVING LAMINATION SIMULATING CHARACTERISTICS
Hartwig Beyersdorf, Bremen-Arbergen, Germany, assignor to Lloyd Dynamowerke G.m.b.H., Bremen, Germany
Filed Oct. 11, 1966, Ser. No. 585,925
Claims priority, application Germany, Oct. 11, 1965,
L 51,848
Int. Cl. B23p 1/08; H02k 1/06, 15/02
U.S. Cl. 219—69                          7 Claims

ABSTRACT OF THE DISCLOSURE

A method of making a stator or rotor of a D.C. excited motor generator, which stator or rotor is made of massive, magnetic material and has a portion simulating a comparable stator or rotor made of laminations which are separated by interspaces or by layers of insulation. The method comprises the step of applying spark discharges to the stator or rotor for eroding material thereof to form slits which simulate the interspaces or layers of insulation between laminations. The slits have a width which is no greater than of the order of approximately 0.2 mm. and a depth no greater than of the order of approximate 10 mm., and are spaced apart a distance no greater than of the order of approximately 0.8 mm.

---

The present invention relates to an electric machine, such as a motor or generator.

The stators and rotors of D.C. excited electric motors and generators, such as synchronous motors and generators, or machines with cyclically-varying reluctance, are generally constituted of a stack consisting of a large number of superposed laminations. The surfaces of the stator and rotor which bound the air gap of the motor or generator are usually formed by the edge surfaces of the individual laminations, particularly in machines where the air gap is narrow. By so fashioning the stator and/or the rotor of a D.C. excited machine, the surface losses, that is to say, the eddy current losses and the hysteresis losses, are reduced inasmuch as the individual laminations are insulated with respect to each toher. The insulation can be constituted, for example, simply by the natural oxide coating of the laminations. On the other hand, it is also customary to insulate the individual laminations from each other by means of an additional coat of lacquer. This complicated structure and the cumbersome assembly of the parts render the stator and rotor relatively expensive, but the use of massive iron parts has been found to be an unsatisfactory substitute because they require a large air gap. Also, even if extremely high-quality magnetic material is used, the surface losses are still relatively great.

It is, therefore, the primary object of the present invention to overcome the drawbacks of the prior art and, in accordance with the present invention, this is done by applying spark discharges to a massive stator or rotor for eroding material thereof to form slits which simulate the interspaces or layers of insulation between laminations. In this way, there is obtained a stator or rotor, particularly one for use in a D.C. excited motor or generator, which is made of massive, magnetic (i.e., magnetizable) material and has a portion which simulates a comparable stator or rotor which is made of laminations that are in fact separated by interspaces or layers of insulation. The term "massive," then, as used throughout the instant specification and claims, is intended to describe a stator or rotor made of a mass of material rather than a stator or rotor which has a body that itself is made up of a stack of superposed, spaced-apart laminations that are separated by interspaces or layers of insulation.

Additioinal objects and advantages of the present invention will become apparent upon consideration of the following description when taken in conjunction with the accompanying drawings in which.

Figure 1:
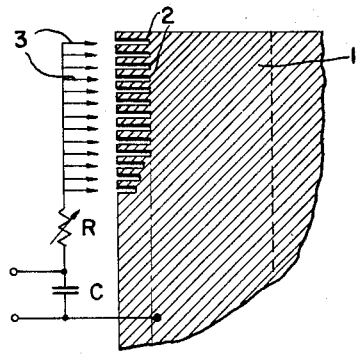
FIGURE 1 is an elevational view, in section, of a tooth of a rotor suitable for use in a medium-frequency machine and being manufactured in accordance with the method of the present invention, FIGURE 1 also showing, schematically, the electric circuitry by means of which the spark discharges are applied to the tooth.
Figure 2:
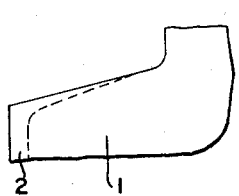
FIGURE 2 is a plan view of the tooth shown in FIGURE 1.
Figure 3:
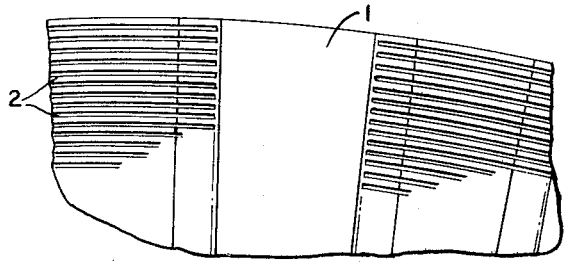
FIGURE 3 is a side view of the tooth shown in FIGURES 1 and 2.
Figure 4:
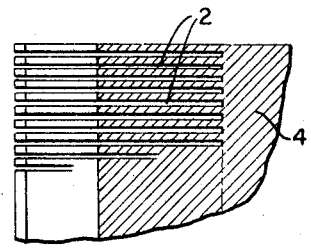
FIGURE 4 shows a part of a stator of a medium-frequency machine, the same having surface portions which are provided with slits in accordance with the present invention.

Referring now to the drawings and first to FIGURES 1, 2, and 3 thereof, the same show a rotor tooth 1 suitable for use in medium-frequency generators with an axially-extending air gap. The tooth has slits 2 which lie on that side of the rotor tooth which is directed toward the medium-frequency winding. The slits can be filled with insulating material.

Thanks to the slits, which are applied by spark discharges that result in erosion of the material, the rotor, which itself is made of massive, magnetic material, has substantially the same characteristics as a rotor made up of a stack of superposed and spaced-apart laminations. Yet a rotor according to the present invention has a number of advantages over laminated rotors, in that the rotor according to the present invention is much easier to manufacture and, moreover, has better heat dissipating characteristics than laminated rotors. Furthermore, the air gap of a machine incorporating a rotor according to the present invention can be kept very small, thereby keeping the exciter losses low; this, in turn, increases the efficiency of the machine.

FIGURE 1 also shows how the slits are formed. This is done by means of a spark discharge circuit that includes a capacitor C and a variable resistor R, one terminal of the RC circuit being connected to the spark discharge electrodes 3 and the other terminal being connected to the rotor tooth 1 which itself serves as the counter electrode, the parts being so aligned that there is an elecrode 3 in alignment with the tooth 1 at each place where a slit is to be provided, the rotor being moved to allow the electrodes to form the slits 2. If the rotor is intended for use in a medium-frequency generator, it suffices if the slits are several millimeters in depth inasmuch as the eddy current and hysteresis losses occur predominantly at the surface.

As best shown in FIGURE 3, not the entire surface of the tooth in provided with the slits but only those surfaces which are near the air gap of the generator of which the rotor is a part, and particularly only those surface portions at which high surface losses, such as those due to magnetic alternating current fields, are expected. No slits are needed where the air gap is relatively large.

Thus, the rotor, though itself massive and made throughout of magnetic material, has a portion which simulates a comparable rotor made of laminations which are separated by interspaces or layers of insulation, this being so because the slits simulate these interspaces or layers of insulation between laminations.

Figure 5:
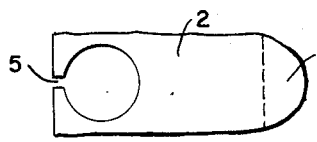
FIGURE 5 is a plan view of the parts shown in FIGURE 4.
Figure 6:
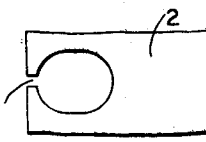
FIGURE 6 is a plan view similar to FIGURE 5 but shows the part as having a differently configured slot.
Figure 7:
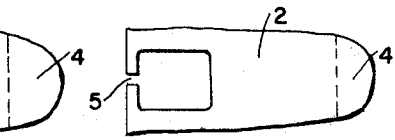
FIGURE 7 is a plan view similar to FIGURES 5 and 6 but shows the part as having a still differently configured slot.
Figure 8:
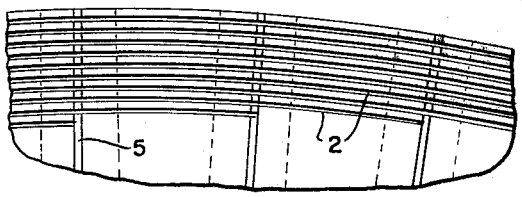
FIGURE 8 is a side view showing the location of the slits near the surface bounding the air gap of the motor or generator of which the stator is a part.

FIGURES 4 to 8 show a portion of a stator 4 suitable for use in a medium-frequency motor or generator and which simulates a stator composed of a stack of spaced-apart, superposed laminations. Such a stator can easily be made of one piece, there being no gap between the laminated and massive part which would require greater excitation and would, moreover, curb the flow of heat. The slits are shown at 2, the air gap for the stray field at 5. FIGURES 5, 6, and 7 show the stator as having slots of circular, oval and rectangular cross sections, respectively.

Figure 10:
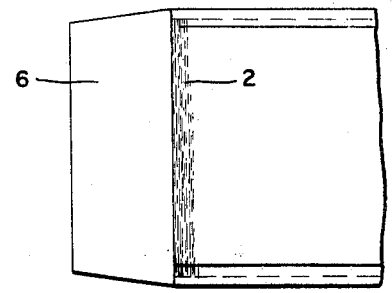
FIGURES 9, 10 and 11 are the front, plan and side views of a pole shoe which is provided with slits in accordance with the present invention.
Figure 9:
Figure 11:
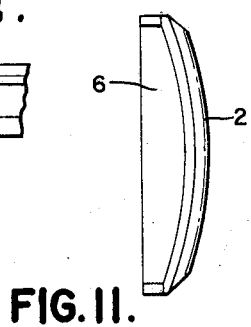

FIGURES 9, 10, and 11 show a massive pole shoe 6 of a rotor of a synchronous machine. The side of the pole shoe which is directed toward the air gap is provided with the slits 2, thereby to reduce the surface losses, so that the pole shoe 6 has, substantially, the same characteristics as a laminated pole shoe. If desired, the pole shoe can also be in the form of a claw-shaped pole.

It will thus be seen that, in accordance with the present invention, a massive rotor or stator is subjected to spark discharges for the purpose of eroding material from the stator or rotor so as to form slits which simulate the interspaces or layers of insulation between the laminations of otherwise comparable laminated stators or rotors. In pratice, these slits need not be provided everywhere but are formed only at those surfaces which bound the air gap of the motor or generator of which the stator or rotor is a part, and particularly only at those portions of the surfaces at which surface losses appear due to magnetic alternating current fields which produce magnetic reversals. Such losses are in the nature of eddy currents or hysteresis losses and can be caused by conductors which lie in the part itself or in an adjacent part and through which there flows an alternating current.

In practice, the slits will, when the stator or rotor is to be used in medium-frequency machines, have a depth of several millimeters, depending on the frequency, and a width of less than 0.05 millimeter, which can easily be done by spark discharge techniques. In any case, there will then be obtained a stator or rotor which has zones that have, substantially, the same characteristics as a comparable stator or rotor but are made up of spaced-apart laminations. In this way, there is, thanks to the method of the present invention, obtained a way of obtaining a massive stator or rotor, that is to say, a stator or rotor which is not made up of laminations, which effectively simulates such laminated stator or rotor, but which is easier and less expensive to manufacture, and which, moreover, has the other advantages described above.

The present invention should not be confused with other methods of manufacture in which it has been sought to impart to a massive stator or rotor the characteristics of a laminated stator or rotor but in which the slits were formed mechanically, because it is only thanks to the fact that the slits are formed by spark discharges that it has been found possible effectively to simulate the characteristics of a laminated stator or rotor.

The following are illustrative and not limitative examples of the method according to the present invention.

In making a rotor for a D.C. excited synchronous motor intended to operate at a frequency of 50 cycles per second, the slits will be about 10 mm. deep, 0.2 mm. wide and spaced apart by 0.8 mm.

In making a rotor for a D.C. excited generator with disc-shaped stator or rotor, and axially-extending air gap, intended to operate at a frequency of 2 kilocycles per second, the slits will be about 2.5 mm. deep, 0.1 mm. wide, and spaced apart by 0.25 mm.

The complete electrical apparatus for applying the spark discharges is, per se, well known in the art and may be of the type shown in the German Letters Patent No. 1,054,614.

It will be understood that the above description of the present invention is susceptible to various modifications, changes, and adaptations, and the same are intended to be comprehended within the meaning and range of equivalents of the appended claims.

What is claimed is:

1. A method of making a stator or rotor of a D.C. excited motor or generator, which stator or rotor is made of massive, magnetic material and has a portion simulating a comparable stator or rotor made of laminations which are separated by interspaces or layers of insulation, comprising the step of applying spark discharges to the stator or rotator for eroding material thereof to form slits which simulate the interspaces or layers of insulation between laminations, which slits have a width which is no greater than of the order of approximately 0.2 mm. and a depth no greater than of the order of approximately 10 mm., and which slits are spaced apart a distance no greater than of the order of approximately 0.8 mm.

2. The method defined in claim 1 wherein the stator or rotor is subjected to the spark discharges only at those surfaces thereof which bound the air gap of the motor or generator of which the stator or rotor is a part.

3. The method defined in claim 2 wherein the stator or rotor is subjected to the spark discharges only at those portions of said surfaces thereof at which surface losses appear due to magnetic alternating current fields.

4. The method defined in claim 1 for making a stator or rotor carrying a winding, wherein the stator or rotor is subjected to the spark discharges only in the region of the winding.

5. A massive stator or rotor made in accordance with the method defined in claim 1.

6. A method as defined in claim 1 used for making a stator or rotor of a D.C. excited motor or generator designed to operate at a frequency of 50 cycles per second, wherein said slits are approximately 10 mm. deep, approximately 0.2 mm. wide, and are spaced approximately 0.8 mm. apart.

7. A method as defined in claim 1, used for making a stator or rotor of a D.C. excited motor generator designed to operate at a frequency of 2 kilocycles per second, wherein said slits are approximately 2.5 mm. deep, approximately 0.1 mm. wide, and are spaced approximately 0.25 mm. apart.

References Cited

UNITED STATES PATENTS

| | | | |
|---|---|---|---|
| 729,655 | 6/1903 | Parsons | 310—261 |
| 3,200,231 | 8/1965 | Bejat. | |

JOSEPH V. TRUHE, Primary Examiner

R. F. STAUBLY, Assistant Examiner

U.S. Cl. X.R.

29—598; 204—143; 310—42, 211